United States Patent Office 3,103,416
Patented Sept. 10, 1963

3,103,416
PREPARATION OF BORANES
Herbert Jenkner, Hannover-Wulfel, Germany, assignor to Kali-Chemie A.G., Hannover, Germany
No Drawing. Filed Mar. 19, 1958, Ser. No. 723,081
Claims priority, application Germany Mar. 20, 1957
1 Claim. (Cl. 23—204)

The invention relates to the preparation of boranes.

In my application Ser. No. 719,996 for "Preparation of Amine-Borines," filed March 10, 1958, now Patent No. 3,051,754, I have disclosed a method of preparation which consists essentially in reacting an alkali metal hydride with a boron halide at a temperature of about 50 to 120° C. in the presence of an organic amine and a compound activating the alkali metal hydride. The reaction, which may be carried out in a solvent or in suspension, proceeds, for instance, according to the equation (1) $6NaH + 2BCl_3 + 2NR_3 \xrightarrow{activator} 2BH_3 \cdot NR_3 + 6NaCl$ Instead of sodium hydride, potassium hydride may be used, and instead of boron trichloride, the corresponding fluorides or bromides, or substituted halides may be employed, $NR_3$ represents primary, secondary or tertiary amines, having preferably a dissociation constant $K_c$ 25 in the range of $10^{-3}$ and $10^{-5}$. R is alkyl such as methyl, ethyl, propyl, or isopropyl. I prefer to use lower trialkylamines. As set forth in my recited earlier application, the amount of amine is not critical; preferably, I use about 5 to 20 percent by weight over the stoichiometric amount.

As solvent and suspending medium, such organic liquids are used which do not react with the alkali metal hydrides and the reactants and reaction products. Such liquids act as suspending medium for the alkali metal hydride and as solvent for the boron halide and the activator. A great number of such liquids is available, for instance hexane, heptane, octane, benzene, toluene, xylene, cyclohexane, methyl cyclohexane, methyl naphthalene, triethylsilane, and mineral oils, particularly high boiling mineral oils.

Suitable activators are organic compounds of the third group of the periodic system, particularly the alkyls, alkyl hydrides, and alkoxides of boron, aluminum, and gallium. Also alkyl esters of boric acid, boronic acid, and borinic acid may be used. Corresponding organic compounds of other metals may be used if such compounds react with the boron halide in the reaction mixture to form the boron compounds. Such metals are, for instance, lithium, sodium, potassium, magnesium, calcium and zinc.

The activator is effective within a very wide proportional range. I prefer to add about 5 to 30 percent by mole, calculated on the alkali metal hydride.

In further development of the procedure described in said application Ser. No. 719,996, I have found that it may be modified to produce diborane or higher boranes, as well as substituted boranes. This is accomplished by increasing the proportion of the reacting boron halide to correspond essentially to the equation (2) $4BCl_3 + 6NaH + 2NR_3 \xrightarrow{activater} B_2H_6 + 6NaCl + 2BCl_3 \cdot NR_3$ The reaction (2) may be carried out in two steps, whereby the first step is represented by Equation 1 and the second step by equation (3) $2BH_3 \cdot NR_3 + 2BCl_3 \rightarrow B_2H_6 + BCl_3 \cdot NR_3$ The $BCl_3 \cdot NR_3$ complex may be reconverted to borazan according to the equation (4) $2BCl_3NR_3 + 6NaH \xrightarrow{activator} 2BH_3NR_3 + 6NaCl$ and again subjected to the reaction (3).

In carrying out the process according to Equation 2, the reactants are heated in the presence of an activator at 50 to 120° C., preferably below 100° C. and at atmospheric pressure. Subsequently, boron halide is added in an amount sufficient to split off the borine. In this second step, the same, higher or lower temperatures may be used as in the first step. Rise of the temperature up to 250° C. favors the formation of higher boranes, such as pentaborane, if boron trichloride is used. Instead of boron trihalides, aluminum trihalides may also be used in the second step.

As will be noted from Equation 3, the boron trihalide or other stronger Lewis acid displaces the weaker borine in the amine-borine and produces from two moles of bound borine one mole of free diborane. In the place of boron trihalides, substituted boron halides of the general formula $BHal_nR_{3-n}$ may be used in the second or also in both steps. In said formula, Hal is halogen, preferably chlorine or bromine, R is alkyl, preferably an alkyl having 1 to 4 C atoms, or aryl, preferably phenyl or tolyl, or the corresponding alkoxy or aroxy groups, $n$ is 1 or 2. It is of advantage to remove after completion of the first reaction step the activator and the alkali metal halide, the latter, for instance, by centrifuging or filtering.

If less boron halide is used as corresponding to Equation 3, there is not obtained a pure boron halide-amine complex but a mixture thereof with the borazan. I have found that such mixture, in which the amine is triethylamine, remains liquid whereas the pure compound $BCl_3 \cdot N(C_2H_5)_3$ is a solid. In such liquid state, the regeneration of the boron halide-amine complex to borazan according to Equation 4 proceeds more smoothly than in the solid form. In this way, the borane preparation may be carried out in a process in which the borazan is recycled after conversion to the boron halide-amine complex and reconversion to borazan by means of activated alkali metal hydride.

The following examples, in which parts are given by weight unless otherwise specified, illustrate the invention but are not intended to limit the same.

Example 1

A suspension of 50 parts of NaH in 230 parts of a mineral oil ($B_{0.1}$ 190–210° C.) were heated, with addition of 14 parts of triethyl borine, at 73° C. Subsequently, 68 parts of triethylamine were added, and into said mixture, there were introduced with vigorous stirring 79 parts of boron trichloride, whereby the temperature was maintained at 73–74° C. Then the temperature was raised to 80° C., and 70 more parts of boron trichloride were added.

There were obtained 7.2 parts of diborane, corresponding to a yield of 88 percent.

Example 2

The procedure was first the same as set forth in Example 1 but N-triethylborazan obtained in the first step (68 parts=88 percent of theory) was distilled off prior to the second addition of boron trichloride. Then 56 parts, corresponding to 80 percent of the stoichiometric amount, of $BCl_3$ were introduced into said borazan. 5.9 parts of diborane (90 percent of the theoretical amount) were obtained, and the remaining liquid mixture consisted of about 20 percent of unreacted $BH_3 \cdot N(C_2H_5)_3$ and 80 percent of $BCl_3 \cdot N(C_2H_5)_3$. Said mixture was added to a suspension of 30.5 parts of sodium hydride in 100 parts of a commercial mineral oil of the type defined in Example 1, containing 14 parts of triethylborine, with vigorout stirring at 73° C. This mixture was then again reacted with boron trichloride, and the cycle according to Equations 4 and 3 can be repeated with return of the $BCl_3 \cdot N(C_2H_5)_3$ mixed with unreacted $BH_3 \cdot N(C_2H_5)_3$.

*Example 3*

A suspension of 50 parts of NaH in 230 parts of a mineral oil ($B_{0.1}$ 190–210° C.) were heated, with addition of 14 parts of triethyl borine at 73° C. Subsequently, 68 parts of triethylamine were added, and into said mixture, there were introduced with vigorous stirring 79 parts of boron trichloride, whereby the temperature was maintained at 73–74° C.

The obtained N-triethylborazan was distilled off and heated at 150° C., whereupon 46 parts of boron trifluoride were introduced.

The yield of boranes, essentially diborane, was 76 per cent.

*Example 4*

Example 3 was repeated but in the second step boron trichloride was used and a temperature of 170° C. instead of 150° C. was applied.

In addition to diborane, higher boranes were obtained with development of hydrogen.

*Example 5*

The first steps were carried out as in Example 3. The separated N-triethylborazan was then heated at 60–80° C. with $BF_3 \cdot (C_2H_5 \cdot O \cdot C_2H_5)_2$. For calculating the yield of developed diborane, it was introduced in triethylamine and the obtained $BH_3 \cdot N(C_2H_5)_3$ was distilled. The yield was determined as 65 percent of the theoretical yield.

*Example 6*

This example was carried out as Example 1 but after the first addition of boron trichloride the temperature was decreased to 25–40° C., and the second portion of $BCl_3$ was introduced at said temperature.

The produced diborane was determined as in Example 5 and found to be 53 parts, corresponding to a yield of more than 89%.

*Example 7*

A suspension of 24 parts of sodium hydride in 220 parts of a mineral oil ($B_1$ 180–220° C.) was heated at 80° C., and first 14 parts of triethylborine and then 37.5 parts of triethylamine were added; subsequently, 43 parts of boron trichloride were introduced at the same temperature with stirring. Vacuum was applied for a short time to remove the sodium hydride activator (triethylborine), the temperature was decreased to about 40° C., and further 43.5 parts of boron trichloride were introduced.

The main reaction product was diborane, which was passed into triethylamine and yielded 29 parts of N-triethyl borazan. In addition, about 3 parts of liquid ethyl boranes were produced.

If methyl borate was used as activator instead of triethyl borine and the reaction of the first step was carried out at a temperature of 90–110° C., the yields were lower by about 5 to 8 percent.

*Example 8*

This example was carried out as Example 7 but instead of the second addition of boron chloride (a) 115 parts of dimethoxy boron chloride and (b) 110 parts of diethyl boron chloride were supplied.

In the first case 50% of the theory of diborane were obtained while in the second case no diborane was obtained but a mixture of alkyl boranes or their trialkylamine adducts respectively, above all, however, dialkyl borane was obtained.

I claim:

A method of preparing diborane comprising reacting boron trichloride with sodium hydride and a lower trialkylamine according to the equation $$4BCl_3 + 6NaH + 2NR_3 \rightarrow B_2H_6 + 6NaCl + 2BCl_3 \cdot NR_3$$

wherein R is a lower alkyl group, in the presence of an efficient amount of an activator selected from the group consisting of alkyls, alkyl hydrides, and alkoxides of boron, aluminum, and gallium; and of alkyl esters of boronic acids and borinic acids, in an inert organic liquid at a temperature of about 0 to 120° C., separating the diborane from the reaction mixture, reacting said $BCl_3 \cdot NR_3$ in a separate step with sodium hydride in the presence of said activator to form $BH_3 \cdot NR_3$, and reacting said $BH_3 \cdot NR_3$ with additional boron trichloride to form diborane.

References Cited in the file of this patent

UNITED STATES PATENTS

| | | |
|---|---|---|
| 2,544,472 | Schlesinger et al. | Mar. 6, 1951 |
| 2,880,058 | Bronaugh | Mar. 31, 1959 |
| 2,945,887 | Jenkner | July 19, 1960 |

FOREIGN PATENTS

| | | |
|---|---|---|
| 559,203 | Belgium | Jan. 13, 1958 |
| 567,684 | Canada | Dec. 16, 1958 |

OTHER REFERENCES

Elliott et al.: "Journal of the American Chemical Society," vol. 74, pages 5047–5052 (1952).

Koster et al.: "Argewandte Chemie," vol. 69, No. 3, pages 94–95 (1957).

Booth et al.: "Boron Trifluoride and Its Derivatives," 1949, pages 43–44.

Schechter et al.: "Boron Hydrides and Related Compounds," prepared under Contract NO2(s) 10992 for Dept. of Navy, Bur. Aeronautics, prepared by Callery Chemical Co., printed March 1951, declassified Dec., 1953, pages 19–21.